US011748524B2

(12) United States Patent
Plouchart et al.

(10) Patent No.: US 11,748,524 B2
(45) Date of Patent: Sep. 5, 2023

(54) TAMPER RESISTANT OBFUSCATION CIRCUIT

(71) Applicant: International Business Machines Corporation, Armonk, NY (US)

(72) Inventors: Jean-Olivier Plouchart, New York, NY (US); Dirk Pfeiffer, Croton on Hudson, NY (US); Arvind Kumar, Chappaqua, NY (US); Takashi Ando, Eastchester, NY (US); Peilin Song, Lagrangeville, NY (US)

(73) Assignee: International Business Machines Corporation, Armonk, NY (US)

( * ) Notice: Subject to any disclaimer, the term of this patent is extended or adjusted under 35 U.S.C. 154(b) by 450 days.

(21) Appl. No.: 16/933,509

(22) Filed: Jul. 20, 2020

(65) Prior Publication Data

US 2022/0019703 A1 Jan. 20, 2022

(51) Int. Cl.
*G06F 21/86* (2013.01)
*G06F 21/14* (2013.01)
(Continued)

(52) U.S. Cl.
CPC ............. *G06F 21/86* (2013.01); *G06F 21/14* (2013.01); *G06F 21/79* (2013.01)

(58) Field of Classification Search
CPC .......... G06F 21/86; G06F 21/14; G06F 21/79; G06F 21/73; G06F 21/76; G06F 21/71
See application file for complete search history.

(56) References Cited

U.S. PATENT DOCUMENTS 5,369,299 A 11/1994 Byrne
5,848,431 A * 12/1998 Pawlowski .......... G11C 7/1045
711/2
(Continued)

FOREIGN PATENT DOCUMENTS

EP 2510475 10/2012
WO 2004021358 3/2004
(Continued)

OTHER PUBLICATIONS

Yousra Alkabani, Hardware Security and Split Fabrication, 2016 11th International Design & Test Symposium (IDT) (Year: 2016).*
(Continued)

*Primary Examiner* — Amie C. Lin
(74) *Attorney, Agent, or Firm* — Stephen J. Walder, Jr.; Jeffrey S. LaBaw (57) ABSTRACT

An obfuscation circuit relies on a tamper-resistant nonvolatile memory which encodes a trusted Boolean function. The Boolean function is used to enable several operations relating to circuit obfuscation, including obfuscation of logic circuitry, obfuscation of operand data, and release of IP blocks. The tamper-resistant nonvolatile memory is part of a trusted integrated circuit structure, i.e., one fabricated by a trusted foundry, separate from another integrated circuit structure which contains the various operational logic circuits of the design and is fabricated by an untrusted foundry. The Boolean function is encoded based on a look-up table implemented as a cascaded multiplexer circuit. Multiple obfuscation functions can be so encoded. The obfuscation functions may be reprogrammed using a protocol that relies on symmetric keys, one of which is stored in the tamper-resistant nonvolatile memory.

20 Claims, 7 Drawing Sheets

(51) Int. Cl.
   *G06F 21/79*     (2013.01)
   *G06F 21/73*     (2013.01)

(56)         References Cited

U.S. PATENT DOCUMENTS

| | | | |
|---|---|---|---|
| 6,512,454 | B2 | 1/2003 | Miglioli et al. |
| 7,734,043 | B1 | 6/2010 | Jefferson et al. |
| 8,741,713 | B2 | 6/2014 | Bruley et al. |
| 9,059,188 | B1 | 6/2015 | Dimitrakopoulos et al. |
| 9,184,751 | B2 | 11/2015 | Pfeiffer et al. |
| 10,289,816 | B1 * | 5/2019 | Malassenet ............. G06F 21/14 |
| 2002/0099948 | A1 | 7/2002 | Kocher et al. |
| 2004/0117744 | A1 | 6/2004 | Nation et al. |
| 2006/0048223 | A1 | 3/2006 | Lee et al. |
| 2007/0121575 | A1 | 5/2007 | Savry et al. |
| 2010/0115260 | A1 | 5/2010 | Venkatesan et al. |
| 2011/0031982 | A1 | 2/2011 | Leon et al. |
| 2011/0227601 | A1 | 9/2011 | Hashimoto et al. |
| 2011/0227603 | A1 | 9/2011 | Leon et al. |
| 2012/0185636 | A1 | 7/2012 | Leon et al. |
| 2014/0042442 | A1 | 2/2014 | Bruley et al. |
| 2014/0042627 | A1 | 2/2014 | Edelstein et al. |
| 2014/0140513 | A1 | 5/2014 | BrghtSky et al. |
| 2015/0071432 | A1 | 3/2015 | Zhu et al. |
| 2016/0373264 | A1 | 12/2016 | Katoh |
| 2018/0011959 | A1 | 1/2018 | Irissou et al. |
| 2018/0060561 | A1 | 3/2018 | Pederson |
| 2018/0373892 | A1 | 12/2018 | Orner et al. |
| 2019/0020343 | A1 * | 1/2019 | Lee ......................... H01L 24/11 |
| 2019/0129892 | A1 | 5/2019 | Sinanoglu et al. |
| 2019/0190725 | A1 | 6/2019 | De et al. |
| 2019/0258766 | A1 | 8/2019 | Wang et al. |
| 2019/0311156 | A1 | 10/2019 | Tehranipoor et al. |
| 2021/0005592 | A1 * | 1/2021 | Lee ..................... H01L 23/5389 |

FOREIGN PATENT DOCUMENTS

| | | |
|---|---|---|
| WO | 2006052935 | 5/2006 |
| WO | 2018009415 | 1/2018 |

OTHER PUBLICATIONS

Imeson, Frank, "Securing Computer Hardware Using 3D Integrated Circuit (IC) Technology and Split Manufacturing for Obfuscation" (paper and slide presentation), Proc. USENIX Security Symposium, University of Waterloo, Electrical and Computer Engineering Dept. (2013).

Wikipedia, "Side-channel attack" [online], retrieved on Jun. 11, 2020 from the Internet URL: https://en.wikipedia.org/wiki/Side-channel_attack (2020).

International Search Report and Written Opinion dated Oct. 20, 2021 for International Application No. PCT/CN2021/106504, 10 pages.

International Search Report and Written Opinion dated Oct. 15, 2021 for International Application No. PCT/CN2021/107123, 9 pages.

* cited by examiner

TAMPER RESISTANT OBFUSCATION CIRCUIT

CROSS-REFERENCE TO RELATED APPLICATION

This application is related to U.S. patent application Ser. No. 16/933,549 entitled "TAMPER-RESISTANT CIRCUIT, BACK-END OF THE LINE MEMORY AND PHYSICAL UNCLONABLE FUNCTION FOR SUPPLY CHAIN PROTECTION" filed concurrently herewith, which is hereby incorporated.

BACKGROUND OF THE INVENTION

Field of the Invention

The present invention generally relates to integrated circuits, and more particularly to a method of securing computer hardware using obfuscation circuitry.

Description of the Related Art

Integrated circuits are used for a wide variety of electronic applications, from simple devices such as wristwatches, to the most complex computer systems. A microelectronic integrated circuit (IC) chip can generally be thought of as a collection of logic cells with electrical interconnections between the cells, formed on a semiconductor substrate (e.g., silicon). An IC may include a very large number of cells and require complicated connections between the cells. A cell is a group of one or more circuit elements such as transistors, capacitors, resistors, inductors, and other basic circuit elements combined to perform a logic function. Cell types include, for example, core cells, scan cells, input/output (I/O) cells, and memory (storage) cells. Each of the cells of an IC may have one or more pins, each of which in turn may be connected to one or more other pins of the IC by wires. The wires connecting the pins of the IC are also formed on the surface of the chip. For more complex designs, there can be many distinct layers of conducting media available for routing, such as a polysilicon layer and multiple metal layers (metal-1, metal-2, etc.).

An IC chip is fabricated by first conceiving the logical circuit description, and then converting that logical description into a physical description, or geometric layout. This process is usually carried out using a "netlist," which is a record of all of the nets, or interconnections, between the cell pins, including information about the various components such as transistors, resistors and capacitors. A layout typically consists of a set of planar geometric shapes in several layers. The layout is then checked to ensure that it meets all of the design requirements, particularly timing requirements. The result is a set of design files known as an intermediate form that describes the layout. The design files are then run through a dataprep process that is used to produce patterns called masks by an optical or electron beam pattern generator. During fabrication, these masks are used to etch or deposit features in a silicon wafer in a sequence of photolithographic steps.

Figure 1:
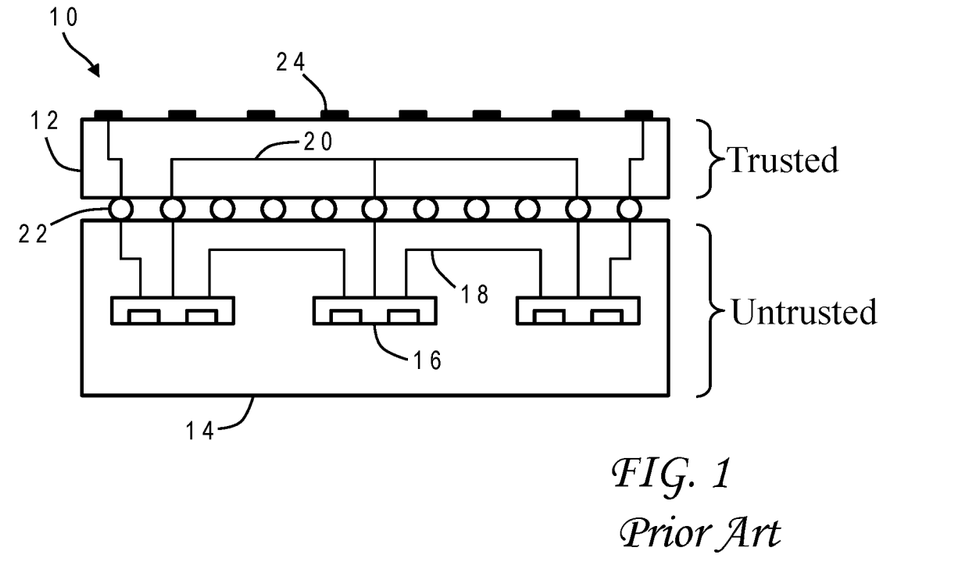
FIG. 1 is an elevational cross-section of a conventional obfuscated integrated circuit having a trusted chip (top tier) and an untrusted chip (bottom tier)

Chip designers are increasingly trying to maintain the secrecy of proprietary designs for integrated circuits. The propriety designs may be contained for example in circuitry referred to as IP (intellectual property) blocks. Even if a foundry can be trusted to safeguard the circuit design netlist, there are still a variety of reverse-engineering techniques that can be used to identify circuits in these proprietary designs from physical analysis of the chip. Consequently, a number of approaches have been devised to combat such reverse-engineering techniques. One approach is obfuscation circuitry. Obfuscation circuitry modifies the structure of an integrated circuit to intentionally conceal its functionality. One way this modification can occur is by splitting up manufacture of the IC chip into two parts, one "trusted" and one "untrusted". As illustrated in FIG. 1, an integrated circuit package 10 consists of a trusted chip 12 and an untrusted chip 14. Untrusted chip 14 includes various logic devices 16 which form the core of the chip functionality. Logic devices 16 are connected to one another and to external pads by wires 18. Some of the connections, however, are incomplete and require wires 20 in trusted chip 12 to complete the circuitry. Pads of trusted chip 12 are electronically connected to the pads of untrusted chips 14 by any conventional means, such bond points having C4 solder balls 22. According to this example, untrusted chip 14 is fabricated by an untrusted foundry, while trusted chip 12 is fabricated by an trusted foundry. Thus, wires 18 in untrusted chip 14 may be discoverable while wires 20 of trusted chip 12 remain hidden. Hidden wires 20 are also connected to input/output (I/O) pins 24. In this way, the chip proprietor can assemble IC package 10 in a secure manner by attaching trusted chip 12 to untrusted chip 14 without the untrusted foundry ever becoming aware of the details of hidden wires 20. Since trusted chip 12 only contains wiring, and no logic circuitry, it can be an interposer which is much cheaper to manufacture than untrusted chip 14.

Figure 2:
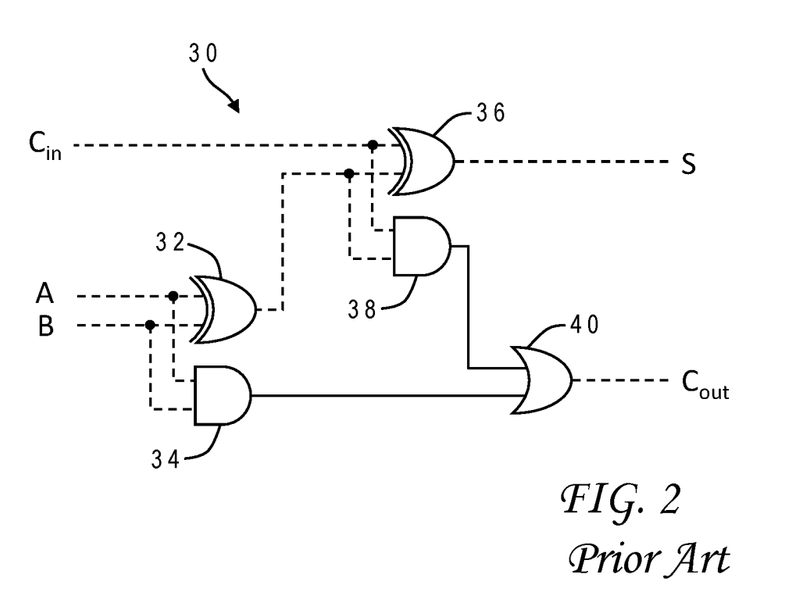
FIG. 2 is a schematic diagram of an conventional binary adder circuit showing obfuscated wiring in dashed lines.

FIG. 2 shows an example of how obfuscation can work for a simple adder circuit 30. A basic binary adder circuit generates the sum S of two binary digits A and B, and can be made from standard logic gates according to the Boolean formulas $$S = A \oplus B \oplus C_{in}, \text{ and}$$

$$C_{out} = C_{in}(A \oplus B) + AB$$

where $C_{in}$ is the input carry signal from a previous adder circuit (for the next less-significant bit) and $C_{out}$ is the output carry signal (for the next more-significant bit). The A and B signals are provided as inputs to a first XOR gate 32 and a first AND gate 34. The output of XOR gate 32 and the $C_{in}$ signal are provided as inputs to a second XOR gate 36 and a second AND gate 38. The output of XOR gate 36 is the S signal. The outputs of AND gates 34 and 38 are input to an OR gate 40 whose output is the $C_{out}$ signal. Further to this example, all of the wires shown in dashed lines in FIG. 2 (the primary signals from A, B and $C_{in}$, and the outputs of gates 32, 36 and 40) have all been obfuscated, that is, this wiring is not part of the chip that will contain the logic gates. Instead, that wiring will be provided by a trusted (secret) interposer. The full adder netlist thereby becomes an obfuscated netlist that only shows connections from gates 34 and 38 to gate 40, making it impossible for the untrusted foundry to discern the function of these gates.

SUMMARY OF THE INVENTION

The present invention in at least one embodiment is generally directed to a method of constructing a tamper-resistant obfuscated circuit by encoding at least one obfuscation function into a tamper-resistant nonvolatile memory of a first integrated circuit structure having wiring which connects the tamper-resistant nonvolatile memory to output pads, and attaching the first integrated circuit structure to a second integrated circuit structure having an obfuscated circuit and wiring which connects control signals of the obfuscated circuit to input pads, wherein the input pads of the second integrated circuit structure are operatively connected to the output pads of the first integrated circuit structure. In the illustrative embodiment the obfuscation function is a Boolean function and the encoding is based on a look-up table for the Boolean function. The look-up table can be implemented as a cascaded multiplexer circuit whose primary inputs are connected to memory cells of the tamper-resistant nonvolatile memory. Multiple obfuscation functions can be encoded in the tamper-resistant nonvolatile memory to control respective obfuscated circuits in the second integrated circuit structure. The tamper-resistant nonvolatile memory may be constructed by surrounding memory cells with a metal mesh formed from multiple metal layers of the first integrated circuit structure, the metal mesh having a spacing which is less than infrared wavelengths. In some implementations the Boolean function is used for multiple purposes, such as obfuscating logic signals, obfuscating operand data values, and selectively releasing logic circuits by enabling power-up signals for the logic circuits in response to corresponding release keys. The invention may accommodate reprogramming of the obfuscation functions using a protocol that relies on symmetric keys, one of which is stored in the tamper-resistant nonvolatile memory.

The above as well as additional objectives, features, and advantages in the various embodiments of the present invention will become apparent in the following detailed written description.

BRIEF DESCRIPTION OF THE DRAWINGS

The present invention may be better understood, and its numerous objects, features, and advantages of its various embodiments made apparent to those skilled in the art by referencing the accompanying drawings.

The use of the same reference symbols in different drawings indicates similar or identical items.

DESCRIPTION OF THE PREFERRED EMBODIMENT(S)

As discussed above, there is a need to protect proprietary designs in integrated circuit structures. While obfuscation circuits go a long way in this regard, if a competitor can still manage to detect wiring of a trusted chip then it becomes much easier to reverse engineer the entire package. There are several techniques that can be used to discern obfuscated circuits including picosecond imaging circuit analysis, side channel attacks, and delayering with measurement. It would, therefore, be desirable to devise an improved method of circuit obfuscation which could overcome these types of reverse-engineering techniques. It would be further advantageous if the method could be used to control access to chip resources. For example, depending on the level of trust of a customer, some digital circuit functionalities or computing resources could be limited by reconfiguring the hardware. These and other advantages are achieved in various implementations of the present invention by providing a trusted obfuscation function integrated in a tamper-resistant nonvolatile memory that is part of a trusted chip (back-end of line). In the illustrative embodiment the obfuscation function is a Boolean function implemented as a look-up table known only to the trusted foundry, yet is still able to control logic functions in an untrusted chip (front-end of line) in a manner that cannot be reverse engineered. In some embodiments the tamper-resistant nonvolatile memory is an array of solid-state memory cells fabricated as part of the trusted chip, with a high-pitch metal mesh formed from multiple metal layers of the trusted chip that surround the memory array. In addition to providing obfuscation of logic signals and data inputs, the Boolean function can be used to release IP circuit functionalities, for example, by providing control over power inputs to the IP circuits. For some implementations chip obfuscation can be reprogrammed in the field using symmetrical encryption. Multiple Boolean obfuscation functions can be spread on a single trusted chip.

Figure 3:
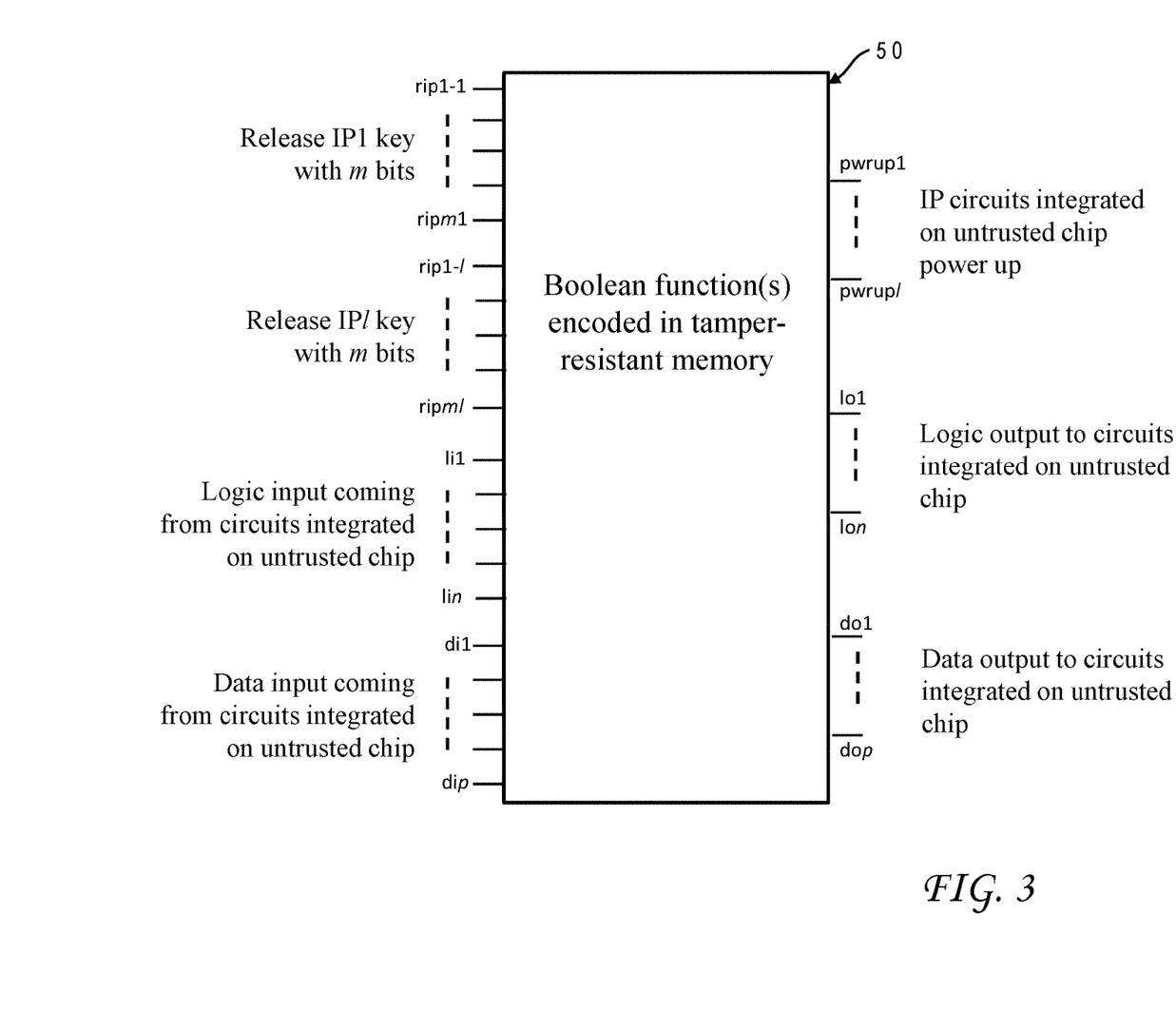
FIG. 3 is a plan view of a trusted Boolean function integrated in a tamper-resistant nonvolatile memory for circuit obfuscation in accordance with one implementation of the present invention.

With reference now to the figures, and in particular with reference to FIG. 3, there is depicted one embodiment 50 of a trusted Boolean function encoded in a tamper-resistant memory in accordance with the present invention. Trusted Boolean function 50 can be used to enable several operations relating to circuit obfuscation for an integrated circuit design whose circuitry is primarily embedded in an untrusted chip, i.e., a chip that is made at an untrusted foundry. In this embodiment, trusted Boolean function 50 allows (i) obfuscation of logic circuitry, (ii) obfuscation of operand data, and (iii) release of IP blocks in the integrated circuit design by enabling power for an IP block when the proper release key is entered. In FIG. 3 the inputs to trusted Boolean function 50 are shown on the left and the outputs are shown on the right. There are l number of IP circuits to be controlled each having a release key with m number of bits, i.e., the release key for the first IP block (IP1) consists of bits {rip11, rip21, ..., ripm1} and the release key for the last IP block (IPl) consists of bits {rip1l, rip2l, ..., ripml}. When the release keys are processed by trusted Boolean function 50 they result in power-up signals {pwerup1, ..., pwrupl}. Each power-up signal is connected to a power enable line of a respective IP block. The power-up signal is only active if the proper release key (based on the logic of trusted Boolean function 50) is input, i.e., an improper release key will not result in activation of its corresponding power-up signal and that IP block will remain disabled.

There are also n number of logic inputs coming from circuits integrated on the untrusted chip {li1, . . . , lin}, and p number of data inputs coming from circuits integrated on the untrusted chip {di1, . . . , dip}. Trusted Boolean function 50 operates on the logic inputs to generate corresponding logic outputs {lo1, . . . , lon} which are connected to control signals of the downstream logic circuitry on the untrusted chip, and operates on the data inputs to generate corresponding data outputs {do1, . . . , don} which are connected to the data signals of the downstream logic circuitry.

Trusted Boolean function 50 can be virtually any Boolean function, i.e., a representation of any set of logic gates with an unlimited number of inputs and outputs. In some embodiments, other types of logic functions can be used besides Boolean, e.g., higher order or functions with operators other than "AND", "OR" and "NOT". While FIG. 3 shows a single Boolean obfuscation function for enabling all of the foregoing operations, those skilled in the art will appreciate that multiple Boolean obfuscation functions can be provided via the tamper-resistant memory. In the illustrative implementation, the Boolean functions are implemented using look-up tables.

Figure 4:
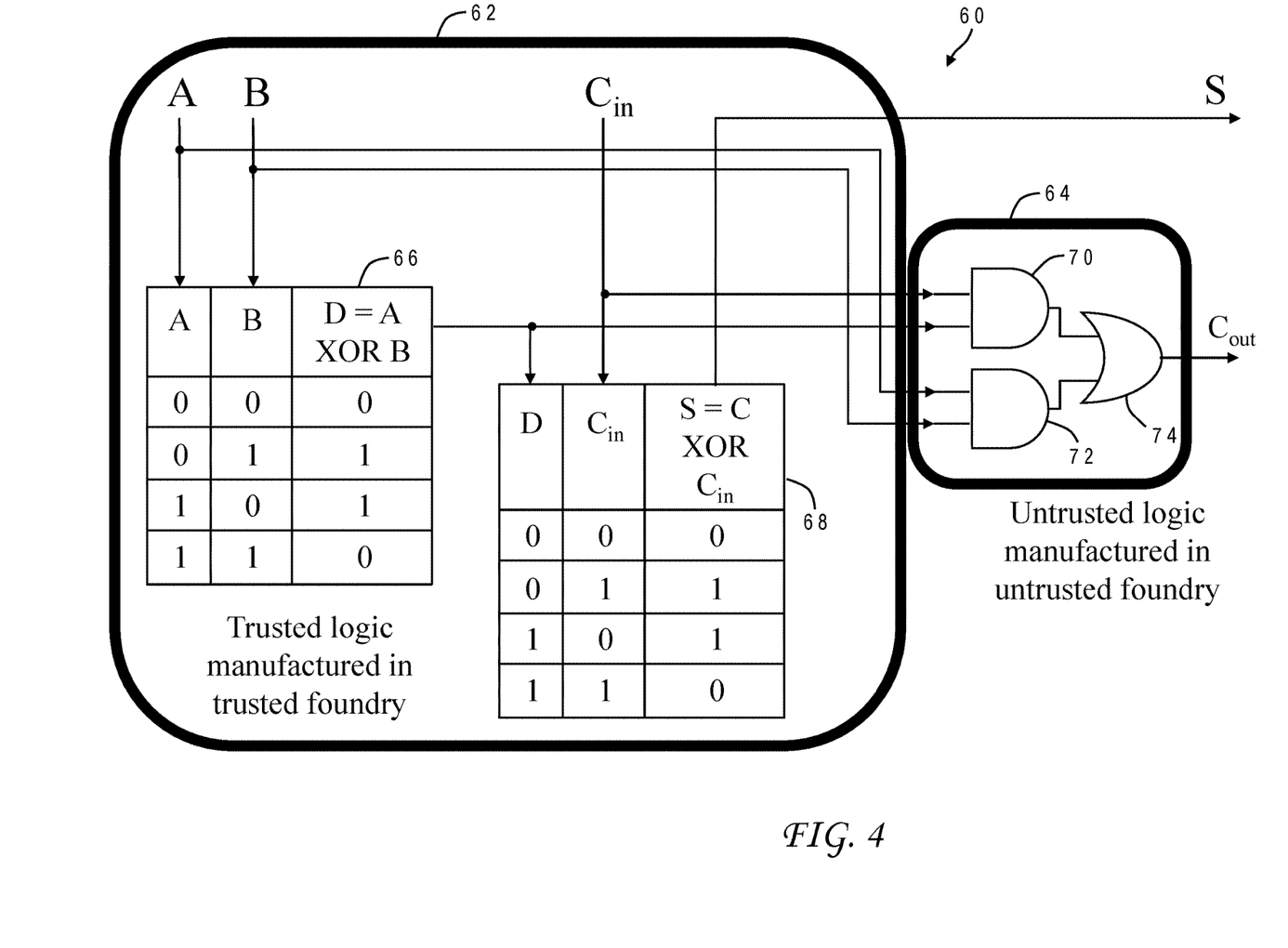
FIG. 4 is a schematic diagram of an obfuscated integrated circuit package having an adder circuit which uses a trusted Boolean function in the form of a lookup table in accordance with one implementation of the present invention.

FIG. 4 gives a more specific example where the trusted Boolean function is a logical XOR operation. This example is provided in the context of an obfuscated binary adder circuit 60. Obfuscated binary adder circuit 60 is constructed in two parts, trusted logic 62 which is manufactured in a trusted foundry and untrusted logic 64 which is manufactured in an untrusted foundry. Obfuscated binary adder 60 has three inputs A, B, and $C_{in}$, and two outputs S and $C_{out}$. A first look-up table 66, encoding a logical XOR operation, receives inputs A and B, and generates an intermediate signal D (compare gate 32 of prior art FIG. 1). A second look-up table 68, also encoding a logical XOR operation, receives the intermediate signal D and input $C_{in}$, and generates the output S (compare gate 36 of prior art FIG. 1). These logic functions 66, 68 are controlled by the contents of the tamper-resistant memory in trusted logic 62. Untrusted logic 64 contains the downstream circuitry which further processes the signals. A first logical AND gate 70 within untrusted logic 64 receives inputs $C_{in}$ and D, and a second logical AND gate 72 within untrusted logic 64 receives inputs A and B. The output of AND gates 70, 72 are connected to inputs of a logical OR gate 74 within untrusted logic 64 whose output is $C_{out}$. The logic of the look-up tables thus remains hidden. As compared to previous solution (FIG. 1), not only the connections are invisible but the obfuscation logic is also invisible. Because the logic is hidden, the obfuscation is more secure. Also, the trusted logic is invisible from untrusted manufacturing. Those skilled in the art will appreciate that the circuit of FIG. 4 is fairly simple for purposes of explanation, but the nature of the specific functional circuits is unlimited. and even for a given circuit there may be multiple (different) implementations of various Boolean functions.

Figure 5:
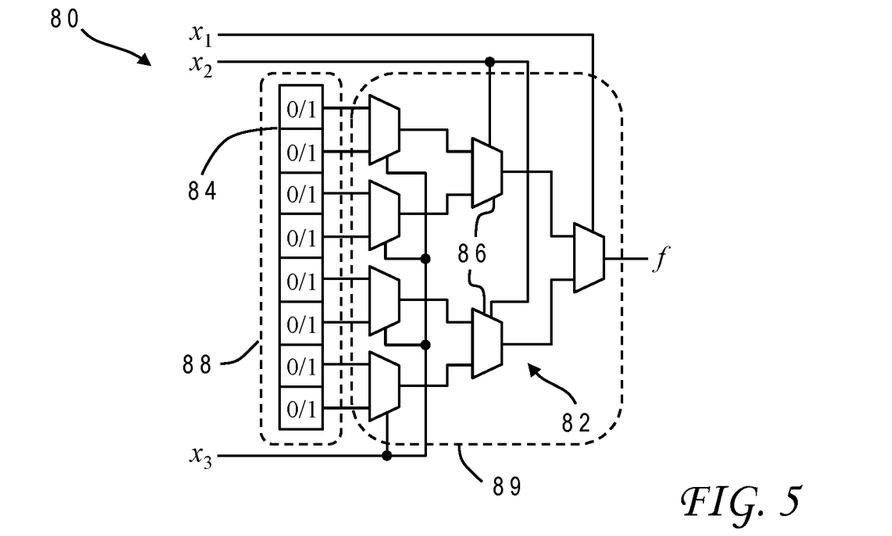
FIG. 5 is a schematic diagram of a multiplexer cascade used to synthesize a Boolean function wherein control bits are located in a tamper-resistant nonvolatile memory in accordance with one implementation of the present invention.

Trusted Boolean obfuscation functions according to the present invention may be implemented in various physical forms. FIG. 5 depicts one embodiment 80 for an obfuscated look-up table using a multiplexer circuit 82. The multiplexers are cascaded, that is, the outputs of a given pair of multiplexers become inputs to the next downstream multiplexer in the cascade. Any Boolean function can generally be synthesized using such a cascade circuit. For instance, a Boolean function with three inputs and one output can be synthesized with eight bits of memory 84 and seven 2:1 multiplexers 86. Each memory cell is programmed with either a '0' or '1' value to encode the Boolean function desired. The memory cells are connected in successive pairs to primary inputs of the cascade, i.e., to inputs of multiplexers at the bottom of the cascade, and a given input $x_1$, $x_2$, $x_3$ to the Boolean function is connected to the control line of each multiplexer in a corresponding multiplexer column, i.e., one input ($x_3$) controls the four multiplexers at the bottom of the cascade, another input ($x_2$) controls the two multiplexers in the middle of the cascade, and the remaining input ($x_1$) controls the final multiplexer. The output of the topmost multiplexer in the cascade becomes the output f of the Boolean function. To obfuscate the look-up table, the eight program bits 84 are integrated into the tamper-resistant memory in a higher level 88 of the integrated circuit (e.g., back-end of line, or BEOL) which is trusted, while multiplexer cascade 82 is integrated in a lower level 89 of the integrated circuit (e.g., front-end of line, or FEOL) which is untrusted. Thus, while the trusted integrated circuit structure may include obfuscation circuitry with actual logic cells, it may in some implementations only contain the control bits while the obfuscation logic remains in the untrusted integrated circuit structure.

Figure 6:
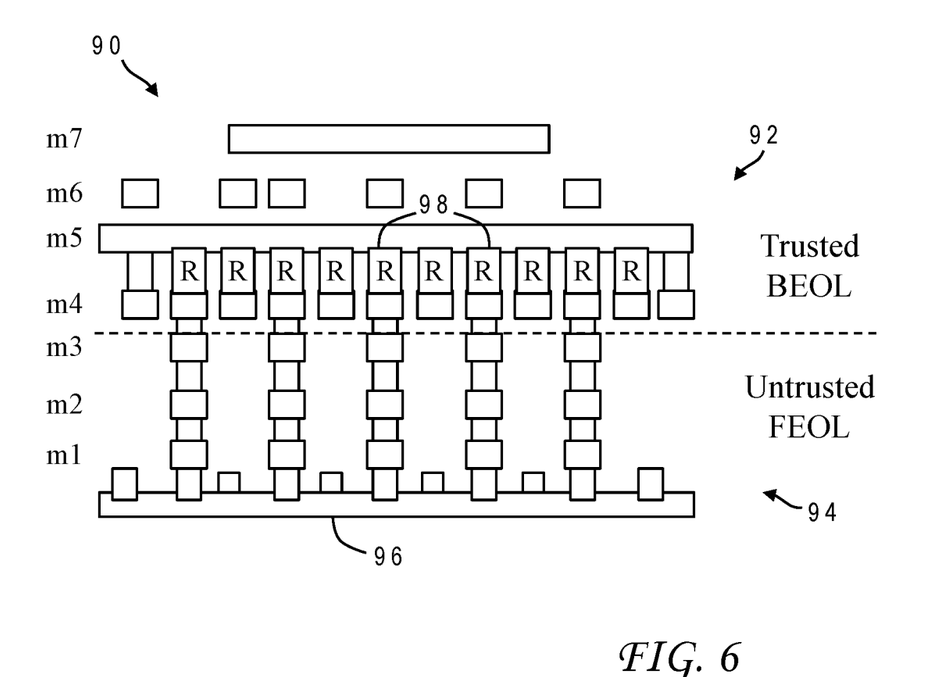
FIG. 6 is an elevational cross-section of an obfuscated integrated circuit showing a tamper-resistant nonvolatile memory protected by a metal mesh in accordance with one implementation of the present invention.

FIG. 6 shows one embodiment of a tamper-resistant memory according to the present invention which may be used to control untrusted logic in an integrated circuit 90. Integrated circuit 90 includes a trusted portion (BEOL) 92 and an untrusted portion (FEOL) 94. Trusted portion 92 may be fabricated separately from untrusted portion 94 and the two parts subsequently attached, or trusted portion 92 may be fabricated on top of untrusted portion 94 such that integrated circuit 90 has a monolithic (unitary) design. Each circuit portion has wiring at various horizontal metal layers m1-m7, with layers m1-m3 being FEOL and layers m4-m7 being BEOL. Logic cells are formed on a semiconductor substrate 96 (e.g., silicon) to form the core operative circuitry of integrated circuit 90 according to the particular design at hand. Integrated circuit 90 may have other layers not called out, e.g., a polysilicon layer. Vias provide vertical connections between adjacent horizontal layers and the logic cells in silicon layer 96.

Trusted portion 92 includes an array of solid-state nonvolatile memory cells 98 located between metal layers m4 and m5. In this cross-section not all connections in the metal layers are shown for all of the memory cells. Also, while only one row of memory cells is shown, it is understood that there can be many rows of cells arranged side-by-side in the array. In some implementations of the present invention, memory cells 98 contain the program bits for controlling cascaded multiplexer circuits as described above in conjunction with FIG. 5. Memory cells 98 are preferably resistive random-access memory (ReRAM) but other memory types may be used, e.g., magnetoresistive random-access memory (MRAM) or phase-change memory (PCM). The metal in layer m5 completely overlaps the memory array, and the interconnecting portions of metal in layer m4 completely overlap each respective memory cell 18. In this manner, the two metal layers form a protective mesh to surround the array, thereby creating a tamper-resistant memory.

In the illustrative implementation, the mesh pitch provides a spacing which is less than infrared camera wavelengths so as to prevent picosecond imaging circuit analysis (PICA read) of the memory, about 1.3 micrometers. In an alternative embodiment the spacing is even less to effectively build a Faraday cage around the memory. Generally a hole in a Faraday cage must be less than around 1/10th the detector wavelength, so for this embodiment the metal spacing would be less than 0.13 micrometers. This construction additionally protects the memory array against side channel attacks as well as delayering and measurement. Other details of tamper-resistant memory 92 are described in copending U.S. patent application Ser. No. 16/933,549, entitled "TAMPER-RESISTANT CIRCUIT, BACK-END OF THE LINE MEMORY AND PHYSICAL UNCLONABLE FUNCTION FOR SUPPLY CHAIN PROTECTION" filed concurrently herewith, which is hereby incorporated.

Figure 7:
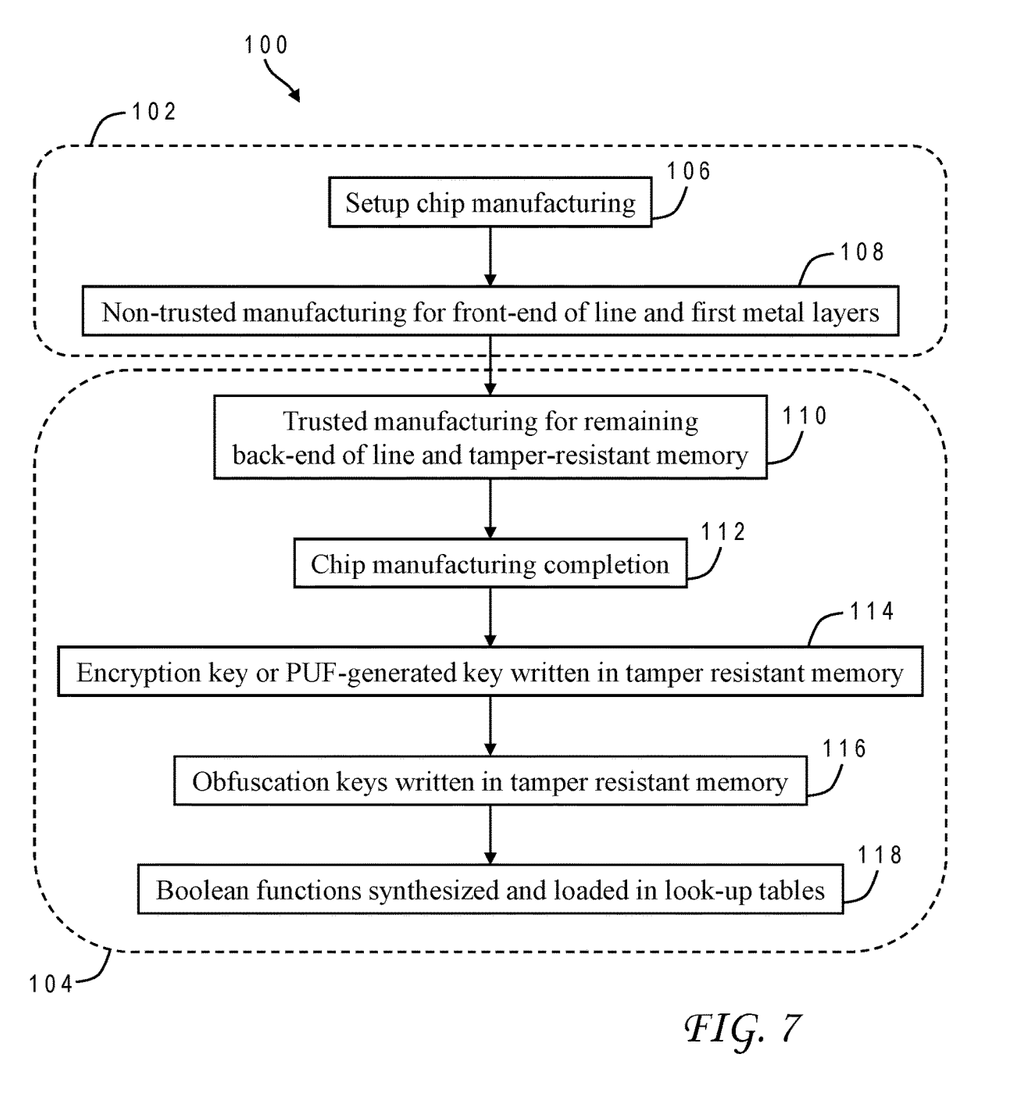
FIG. 7 is a chart illustrating the logical flow for a trusted manufacturing, chip obfuscation and encryption process in accordance with one implementation of the present invention.
Figure 8:
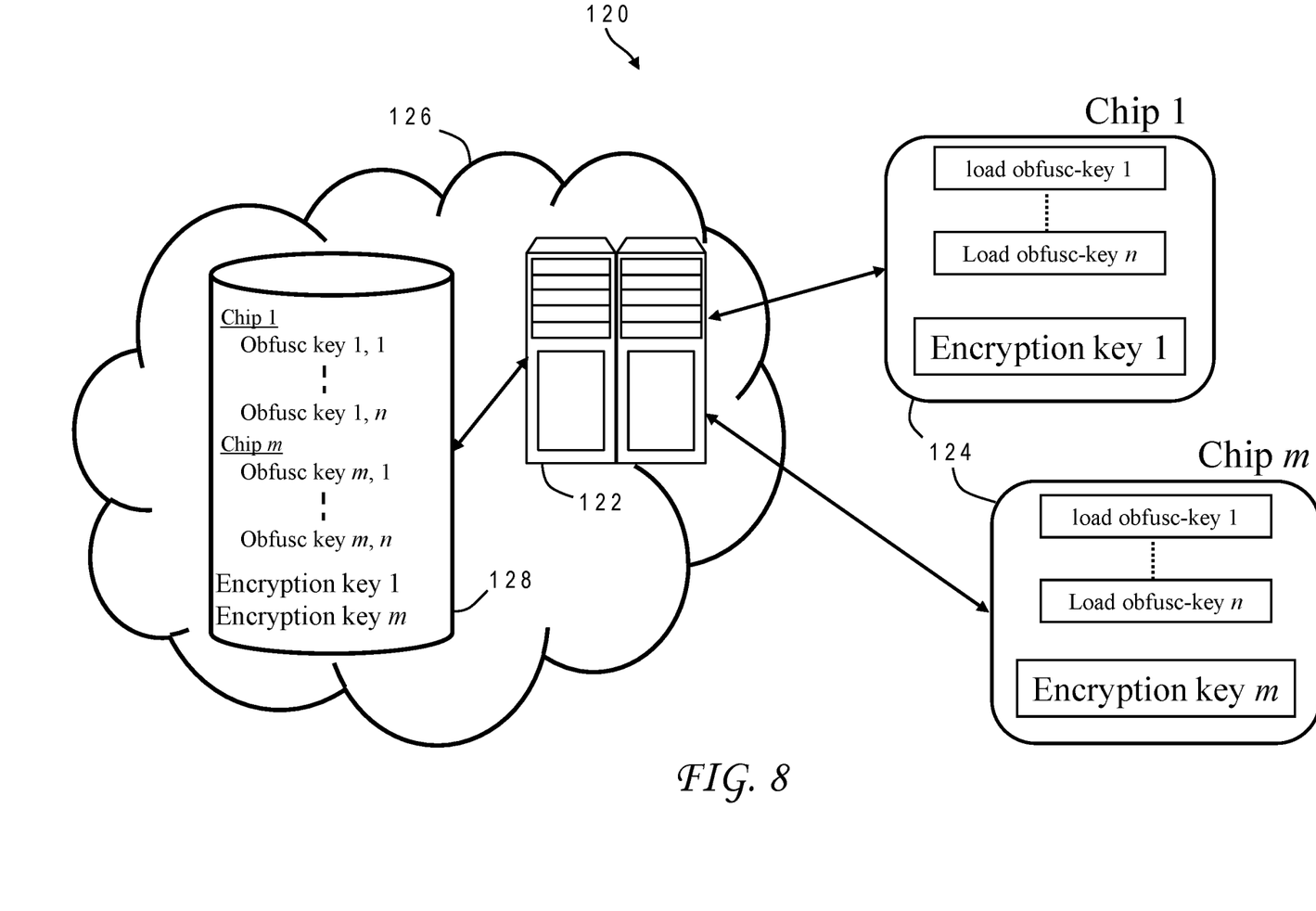
FIG. 8 is a pictorial representation of chip obfuscation reprograming in the field using symmetrical encryption in accordance with one implementation of the present invention.

The obfuscation methods of the present invention may advantageously be used with other security measures to enhance control over access to chip resources. These measures may include, among others, various encryption functions or physical unclonable functions whose keys are written to the tamper-resistant memory. A physical unclonable function (PUF) is a device that exploits inherent randomness introduced during manufacturing to give a physical entity a unique "fingerprint" or trust anchor. These features may be further understood with reference to the chart of FIG. 7 which illustrates the logical flow for a trusted manufacturing, chip obfuscation and encryption process 100 in accordance with one implementation of the present invention. Process 100 may be broken down into two sets of steps 102, 104. Steps 102 are carried out by an untrusted foundry, while steps 104 are carried out by a trusted foundry. Process 100 begins with the untrusted foundry setting up the chip manufacturing 106, based on the particular layouts provided. Non-trusted manufacturing 108 is then performed for front-end of line logic and metal layers. At this point the process is handed off to the trusted foundry, which carries out trusted manufacturing 110 for the remaining back-end of line including the tamper-resistant memory. Any final steps such as packaging are carried out for chip manufacturing completion 112. An encryption key or PUF-generated key is written to the tamper-resistant memory 114. The chip includes appropriate pins to allow the memory cells to be programmed. Additional obfuscation keys, explained further below in conjunction with FIG. 8, are written to the tamper-resistant memory 116. The trusted Boolean functions for obfuscation are synthesized and the appropriate control bits are loaded in the look-up tables 118. The chip is now ready for deployment.

As described above, multiple IP blocks (or other circuit blocks) in the chip can be selectively enabled and disabled via trusted Boolean obfuscation functions. The use of encryption or PUF-generated keys allows this feature to be reprogrammable in a secure manner. FIG. 8 shows an example 120 of how chip obfuscation can be reprogrammed in the field using symmetrical encryption. A server or other computer system 122 is used to manage obfuscation functions for a plurality of chips 124 (chips 1 through m). Server 122 is preferably a cloud server, operating in a cloud environment. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include various characteristics, service models, and deployment models.

Characteristics can include, without limitation, on-demand service, broad network access, resource pooling, rapid elasticity, and measured service. On-demand self-service refers to the ability of a cloud consumer to unilaterally provision computing capabilities, such as server time and network storage, as needed automatically without requiring human interaction with the service's provider. Broad network access refers to capabilities available over a network and accessed through standard mechanisms that promote use by heterogeneous thin or thick client platforms (e.g., mobile phones, laptops, and personal digital assistants, etc.). Resource pooling occurs when the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity means that capabilities can be rapidly and elastically provisioned, in some cases automatically, to quickly scale out and rapidly released to quickly scale in. To the consumer, the capabilities available for provisioning often appear to be unlimited and can be purchased in any quantity at any time. Measured service is the ability of a cloud system to automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models can include, without limitation, software as a service, platform as a service, and infrastructure as a service. Software as a service (SaaS) refers to the capability provided to the consumer to use the provider's applications running on a cloud infrastructure. The applications are accessible from various client devices through a thin client interface such as a web browser. The consumer does not manage or control the underlying cloud infrastructure including network, servers, operating systems, storage, or even individual application capabilities, with the possible exception of limited user-specific application configuration settings. Platform as a service (PaaS) refers to the capability provided to the consumer to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a service (IaaS) refers to the capability provided to the consumer to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models can include, without limitation, private cloud, community cloud, public cloud, and hybrid cloud. Private cloud refers to the cloud infrastructure being operated solely for an organization. It may be managed by the organization or a third party and may exist on-premises or off-premises. A community cloud has a cloud infrastructure that is shared by several organizations and supports a specific community that has shared concerns (e.g., mission, security requirements, policy, and compliance considerations). It may be managed by the organizations or a third party and may exist on-premises or off-premises. In a public cloud, the cloud infrastructure is made available to the general public or a large industry group and is owned by an organization selling cloud services. The cloud infrastructure for a hybrid cloud is a composition of two or more clouds (private, community, or public) that remain unique entities but are bound together by standardized or proprietary technology that enables data and application portability (e.g., cloud bursting for load-balancing between clouds).

Returning to FIG. 8, chips 124 are assembled into one or more devices having communications hardware that allows the chips to communicate with external networks. Cloud server 122 can thereby communicate with chips 124 via a network 126 such as the Internet. Each chip has a set of load obfuscation keys 1 through n and an encryption key loaded in the tamper-resistant memory of the chip (obfuscation logic can also be programmed into the tamper-resistant memory). The load obfuscation keys are used to unlock programming of respective obfuscation functions. Cloud server 122 can access a chip obfuscation and reprogramming database 128 which contains all of the sets of load obfuscation keys and encryption (PUF) keys which are symmetric with the encryption keys in the chips. When reprogramming of a particular chip is desired, cloud server 122 transmits the relevant load obfuscation key to the chip along with new obfuscation data. The chip then loads the new data into its tamper-resistant memory. These operations are performed by logic circuits provided for this purpose in the chip. The new obfuscation data implement different obfuscation functions embedded in the tamper-resistant memory to selectively change access to particular circuit blocks of the chip.

Figure 9:
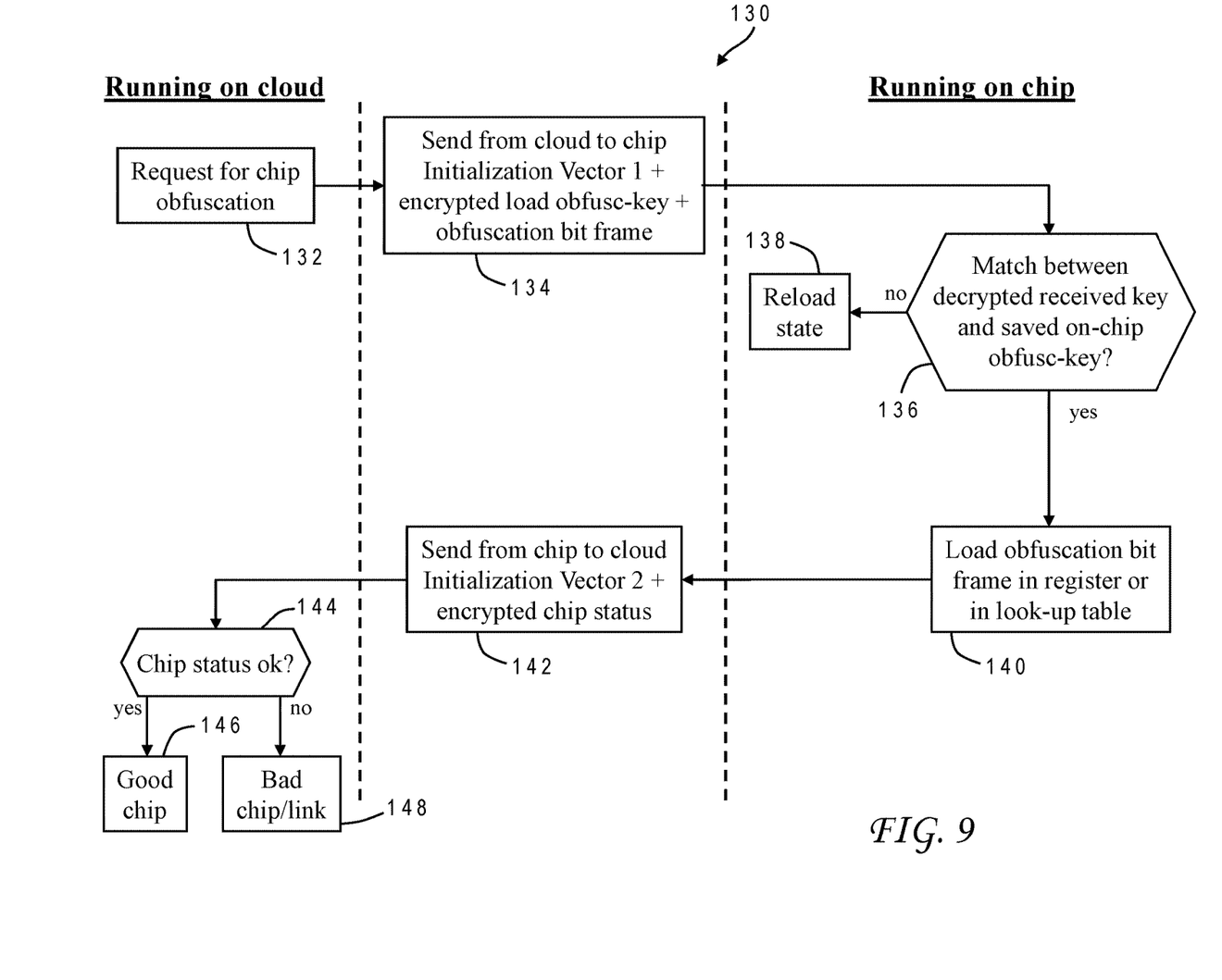
FIG. 9 is a chart depicting the logical flow for a obfuscation reprograming protocol using symmetrical encryption in accordance with one implementation of the present invention.

A number of different protocols may be used to carry out the loading of new obfuscation keys. The protocol is preferably adapted to prevent man-in-the-middle attacks as well as any chip or cloud misrepresentation. The protocol can also advantageously be designed to be secure even if the communications link is not secure or if the chip or local device is untrusted. One suitable protocol 130 is seen in FIG. 9, using symmetrical encryption according to an illustrative implementation. Protocol 130 begins when the cloud server receives a request for chip obfuscation 132. The cloud server sends a transmission to the chip 134 with an initialization vector, the load obfuscation key that has been encrypted based on the initialization vector, and an obfuscation bit frame which contains the new obfuscation data. Here, initialization vectors are generated randomly and are used to generate different encrypted transmissions even when the same data is sent. Each chip has a different encryption key, so if the sent frame is recorded (man-in-the-middle attack), it cannot be applied to another chip. When the chip receives this transmission, it decrypts the load obfuscation key and compares it to the corresponding load obfuscation key currently stored in the tamper-resistant memory 136. If the two keys do not match, the previous state is reloaded 138 so that operations are similar to loading a new state. A rogue chip cannot be used to discern the load obfuscation key since it is encrypted.

If the two load obfuscation keys do match, the obfuscation bit frame is loaded in the memory register or look-up table 140. The chip then sends a response transmission 142 to the cloud server with a second initialization vector and a chip status that has been encrypted based on the initialization vector. The cloud server decrypts the chip status 144 to determine a result of whether the chip is good 146 or whether it (or the communications link) is bad 148. The result can be provided to a system supervisor. Protocol 130 allows an unlimited number of obfuscation reprogrammings. The reprogramming not only serves to secure the digital IP but can additionally control the computing resources. The protocol is effective even if the communications channel is untrusted and the end device containing the chip that needs to be programed is untrusted.

The present invention in its manifold embodiments thereby provides a superior solution to chip IP protection via circuit obfuscation. Since the obfuscating logic is effectuated with a tamper-resistant memory it cannot be reversed engineered. Certain chip functionality can be enabled depending of the trust level of the user. In terms of gray market protection, chip functionality could be enabled only after board assembly and the end product is in the hands of a trusted user. Stolen chips or devices would be non-functional. For some implementations, a chip could be disabled at the end of a life cycle, or disabled after a pre-programmed number of clock cycles. These are only some of the many applications that can be provided or enhanced by the present invention. It is therefore contemplated that other modifications can be made without departing from the spirit or scope of the present invention as defined in the appended claims.

What is claimed is:

1. A method comprising:
    encoding at least one obfuscation function into a tamper-resistant nonvolatile memory of a first integrated circuit structure having wiring which connects the tamper-resistant nonvolatile memory to output pads, wherein the first integrated circuit structure is manufactured by a trusted foundry as part of a trusted portion of the integrated circuit device, and wherein logic of the at least one obfuscation function is obfuscated by the first integrated circuit structure from external detection; and
    attaching the first integrated circuit structure to a second integrated circuit structure having an obfuscated circuit and wiring which connects control signals of the obfuscated circuit to input pads of the second integrated circuit structure, wherein;
    attaching operatively connects the input pads of the second integrated circuit structure to the output pads of the first integrated circuit structure,
    the second integrated circuit structure is manufactured by an untrusted foundry as part of an untrusted portion of an integrated circuit device, and
    the obfuscated circuit comprises a plurality of circuit blocks in the untrusted portion of the integrated circuit device that are selectively enabled or disabled based on a release key input to the at least one obfuscation function of the trusted portion of the integrated circuit device.

2. The method of claim 1 wherein the obfuscation function is a Boolean function and the encoding is based on a look-up table for the Boolean function.

3. The method of claim 2 wherein the control signals of the obfuscated circuit are inputs to a cascaded multiplexer circuit which implements the look-up table.

4. The method of claim 1 wherein the obfuscation function allows selective release of at least one circuit block of the second integrated circuit structure by enabling a power-up signal for the circuit block.

5. The method of claim 1 wherein multiple obfuscation functions are encoded in the tamper-resistant nonvolatile memory which control respective obfuscated circuits in the second integrated circuit structure.

6. The method of claim 1 wherein the tamper-resistant nonvolatile memory includes at least one load obfuscation key and an encryption key, and further comprising:
receiving a new obfuscation key which is encrypted and an obfuscation bit frame having at least one new obfuscation function;
using the encryption key to decrypt the new obfuscation key;
determining that the decrypted new obfuscation key matches the load obfuscation key; and
responsively reprogramming the obfuscation function by loading the obfuscation bit frame into the tamper-resistant nonvolatile memory.

7. The method of claim 1 wherein memory cells of the tamper-resistant nonvolatile memory are surrounded by a metal mesh formed from multiple metal layers of the first integrated circuit structure, and wherein:
a first metal layer of the multiple metal layers completely overlaps a memory array of the tamper-resistant nonvolatile memory,
interconnecting portions of a second metal layer of the multiple metal layers overlap each respective memory cell in the memory cells of the tamper-resistant nonvolatile memory, and
the metal mesh has a spacing which is less than infrared wavelengths and provides a Faraday cage around the memory array of the tamper-resistant nonvolatile memory.

8. The method of claim 7 wherein the spacing is less than 0.13 micrometers.

9. The method of claim 1, further comprising:
encoding, into the tamper-resistant nonvolatile memory, an encryption key and one or more obfuscation keys; and
writing, into the at least one obfuscation function, control bits for controlling which set of circuit blocks, of the plurality of circuit blocks, of the obfuscated circuit are enabled or disabled based on release key inputs to the at least one obfuscation function.

10. The method of claim 9, further comprising:
deploying the integrated circuit device; and
after deployment of the integrated circuit device:
transmitting, from a cloud server, an encrypted communication comprising a load obfuscation key and an obfuscation bit frame to the integrated circuit device;
decrypting, by the integrated circuit device, the encrypted communication based on the encoded encryption key in the tamper-resistant nonvolatile memory to access the load obfuscation key and obfuscation bit frame;
comparing the load obfuscation key from the decrypted communication to the one or more obfuscation keys; and
in response to the load obfuscation key matching an obfuscation key in the one or more obfuscation keys, updating the at least one obfuscation function based on obfuscation data in the obfuscation bit frame.

11. An obfuscation circuit comprising:
a first integrated circuit structure having a tamper-resistant nonvolatile memory which encodes at least one obfuscation function, and having wiring which connects the tamper-resistant nonvolatile memory to output pads, wherein the first integrated circuit structure is manufactured by a trusted foundry as part of a trusted portion of the obfuscation circuit, and wherein logic of the at least one obfuscation function is obfuscated by the first integrated circuit structure from external detection; and a second integrated circuit structure having a semiconductor substrate with a plurality of logic cells formed therein, at least some of the logic cells being part of a logic circuit, the second integrated circuit structure including wiring which interconnects one or more logic cells of the logic circuit with a plurality of input pads, wherein;
the first integrated circuit structure is attached to the second integrated circuit structure such that the input pads of the second integrated circuit structure are operatively connected to the output pads of the first integrated circuit structure,
the second integrated circuit structure is manufactured by an untrusted foundry as part of an untrusted portion of the obfuscation circuit, and
the plurality of logic cells comprises a plurality of circuit blocks in the untrusted portion of the obfuscation circuit that are selectively enabled or disabled based on a release key input to the at least one obfuscation function of the trusted portion of the integrated circuit device.

12. The obfuscation circuit of claim 11 wherein the obfuscation function is a Boolean function and the encoding is based on a look-up table for the Boolean function.

13. The obfuscation circuit of claim 12 wherein the look-up table is implemented as a cascaded multiplexer circuit having primary inputs connected to the input pads.

14. The obfuscation circuit of claim 11 wherein the obfuscation function allows selective release of at least one circuit block of the second integrated circuit structure by enabling a power-up signal for the at least one circuit block.

15. The obfuscation circuit of claim 11 wherein multiple obfuscation functions are encoded in the tamper-resistant nonvolatile memory which control respective logic circuits in the second integrated circuit structure.

16. The obfuscation circuit of claim 11 wherein memory cells of the tamper-resistant nonvolatile memory are surrounded by a metal mesh formed from multiple metal layers of the first integrated circuit structure, and wherein:
a first metal layer of the multiple metal layers completely overlaps a memory array of the tamper-resistant nonvolatile memory,
interconnecting portions of a second metal layer of the multiple metal layers overlap each respective memory cell in the memory cells of the tamper-resistant nonvolatile memory, and
the metal mesh has a spacing which is less than infrared wavelengths and provides a Faraday cage around the memory array of the tamper-resistant nonvolatile memory.

17. The obfuscation circuit of claim 11, wherein:
an encryption key and one or more obfuscation keys are encoded in the tamper-resistant nonvolatile memory,
control bits are written into the at least one obfuscation function for controlling which set of circuit blocks, of the plurality of circuit blocks, of the obfuscated circuit are enabled or disabled based on release key inputs to the at least one obfuscation function,
the integrated circuit device is deployed after encoding the tamper resistant nonvolatile memory and writing control bits to the at least one obfuscation function, and
after deployment of the integrated circuit device:
an encrypted communication is received, from a server computing system, comprising a load obfuscation key and an obfuscation bit frame, the encrypted communication is decrypted based on the encoded encryption key in the tamper-resistant nonvolatile memory to access the load obfuscation key and obfuscation bit frame, the load obfuscation key from the decrypted communication is compared to the one or more obfuscation keys, and in response to the load obfuscation key matching an obfuscation key in the one or more obfuscation keys, the at least one obfuscation function is updated based on obfuscation data in the obfuscation bit frame.

18. An integrated circuit package comprising:

a first integrated circuit having a plurality of logic circuits which are controlled by logic signals to operate on operand data values, wherein the first integrated circuit structure is manufactured by an untrusted foundry as part of an untrusted portion of the integrated circuit package; and a second integrated circuit having at least one Boolean function encoded in a tamper-resistant nonvolatile memory of the second integrated circuit, wherein the at least one Boolean function obfuscates one or more of the logic signals and one or more of the operand data values, and selectively releases at least one of the logic circuits by enabling a power-up signal for the at least one logic circuit in response to a corresponding release key, wherein:

the second integrated circuit is manufactured by a trusted foundry as part of a trusted portion of the integrated circuit package, logic of the at least one obfuscation function is obfuscated by the second integrated circuit from external detection, and the plurality of logic circuits of the first integrated circuit comprises a plurality of circuit blocks in the untrusted portion of the integrated circuit package that are selectively enabled or disabled based on a release key input to the at least one Boolean function of the trusted portion of the integrated circuit package.

19. The integrated circuit package of claim 18 wherein the Boolean function is encoded based on a look-up table.

20. The integrated circuit package of claim 19 wherein the look-up table is implemented as a cascaded multiplexer circuit whose primary inputs are controlled by memory cells of the tamper-resistant nonvolatile memory.

* * * * *